(12) United States Patent
Yan et al.

(10) Patent No.: US 9,098,541 B2
(45) Date of Patent: Aug. 4, 2015

(54) SEMANTIC USER PROFILES FOR TARGETING USER SEGMENTS

(71) Applicant: Microsoft Corporation, Redmond, WA (US)

(72) Inventors: Jun Yan, Beijing (CN); Ning Liu, Beijing (CN); Lei Ji, Beijing (CN); Steven J. Hanks, Redmond, WA (US); Qing Xu, San Jose, CA (US); Zheng Chen, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/020,402

(22) Filed: Sep. 6, 2013

(65) Prior Publication Data

US 2014/0012842 A1 Jan. 9, 2014

Related U.S. Application Data

(62) Division of application No. 13/235,140, filed on Sep. 16, 2011, now Pat. No. 8,533,188.

(51) Int. Cl.
*G06F 17/30* (2006.01)
(52) U.S. Cl.
CPC .... *G06F 17/30321* (2013.01); *G06F 17/30867* (2013.01)
(58) Field of Classification Search
CPC ........................................................ G06F 17/30
USPC ................................................. 707/600–899
See application file for complete search history.

(56) References Cited

U.S. PATENT DOCUMENTS

| 6,564,210 | B1 * | 5/2003 | Korda et al. ........................... 1/1 |
| 7,801,896 | B2 | 9/2010 | Szabo |
| 2002/0052873 | A1 | 5/2002 | Delgado et al. |
| 2007/0143260 | A1 | 6/2007 | Markov et al. |
| 2010/0100607 | A1 | 4/2010 | Scholz et al. |
| 2011/0191311 | A1 | 8/2011 | Polonsky et al. |
| 2013/0073546 | A1 | 3/2013 | Yan et al. |

OTHER PUBLICATIONS

Middleton et al., "Capturing Knowledge of User Preferences Ontologies in Recommender Systems," retrieved at <<http://users.ecs.soton.ac.uk/sem/kcap-paper.pdf>>, Proceedings of the 1st international conference on Knowledge capture, New York, NY, Oct. 2001, 8 pages.

(Continued)

*Primary Examiner* — Isaac M Woo
(74) *Attorney, Agent, or Firm* — Stephen A. Wight; Judy Yee; Micky Minhas

(57) ABSTRACT

Embodiments facilitate greater flexibility in definition of user segments for targeted advertising, by employing indexed semantic user profiles. Semantic user profiles are built through extraction of online user behavior data such as user search queries and page views, and include user interest information that is inferred based on user behavior. Semantic user profiles are then indexed to facilitate search for a set of users that fit specified semantic search terms. Search results for semantic profiles are ranked according to a ranking model developed through machine learning. In some embodiments, building and indexing of semantic profiles and learning of the ranking model is performed offline to facilitate more efficient online processing of queries.

20 Claims, 10 Drawing Sheets

(56) References Cited

OTHER PUBLICATIONS

Office action for U.S. Appl. No. 13/235,140, mailed on Jan. 28, 2013, Yan et al., "Indexing Semantic User Profiles for Targeted Advertising", 12 pages.

Schafer et al., "E-Commerce Recommendation Applications," retrieved at <<http://citeseerx.ist.psu.edu/viewdoc/download?doi=10.1.1.43.1280&rep=rep1&type=pdf>>, Data Mining and Knowledge Discover, vol. 5, No. 1-2, 115-153, Jan. 2001, 24 pages.

Schiaffino et al., "Intelligent User Profiling," retrieved May 16, 2011 at <<http://www.exa.unicen.edu.ar/catedras/knowmanage/apuntes/56400193.pdf>>, Book Artificial Intelligence, Springer-Verlag, Berlin, Heidelberg, (c) 2009, 24 pages.

Sieg et al., "Learning Ontology-Based User Profiles a Semantic Approach to Personalized Web Search," retrieved at <<http://citeseerx.ist.psu.edu/viewdoc/download?doi=10.1.1.89.3954&rep=rep1&type=pdf>>, IEEE Intelligent Informatics Bulletin, vol. 8, No. 1, Nov. 2007, 12 pages.

\* cited by examiner

SEMANTIC USER PROFILES FOR TARGETING USER SEGMENTS

CROSS-REFERENCE TO RELATED APPLICATIONS

This application is a divisional application of U.S. Ser. No. 13/235,140, entitled INDEXING SEMANTIC USER PROFILES FOR TARGETED ADVERTISING, and filed on Sep. 16, 2011, which is incorporated herein by reference in its entirety.

BACKGROUND

The growth of the World Wide Web has led to a greater quantity and variety of information available to users online. Because much web content is made available for free or at relatively low cost to users, web site and web service providers often employ online advertising to generate revenue. In general, online advertising provides a means for displaying visual and audio ads to potential customers as they view web pages, perform searches through web-based search engines, use social networking sites, use electronic mail services, play games, view entertainment content, and generally engage in online activities.

One advantage of online advertising over more traditional forms of advertising (e.g., radio, television, and print ads) is the greater flexibility of online advertisers to tailor advertising campaigns based on time, location, context, and user segment (e.g. a group of users). In particular, online advertisers employ behavioral targeting to increase the effectiveness of an advertising campaign by targeting user groups with specific ads based on information that is known about the users' aggregate behavior and interests. However, because traditional behavioral targeting methods generally rely on pre-defined user segments that may be too broad or too narrow for a particular advertiser's needs, advertisers may miss valuable opportunities to provide the right advertisement that is more specifically targeted to a particular user segment or individual user.

SUMMARY

To achieve greater flexibility in the definition of user segments for targeted advertising, a semantic profile is defined for one or more online users. The semantic profiles are indexed for searching, and search results for semantic profiles are ranked and provided to a potential advertiser or other entity that wishes to create a user segment. The ranking may be performed offline, and may be based on a ranking model developed through machine learning.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

Figure 1:
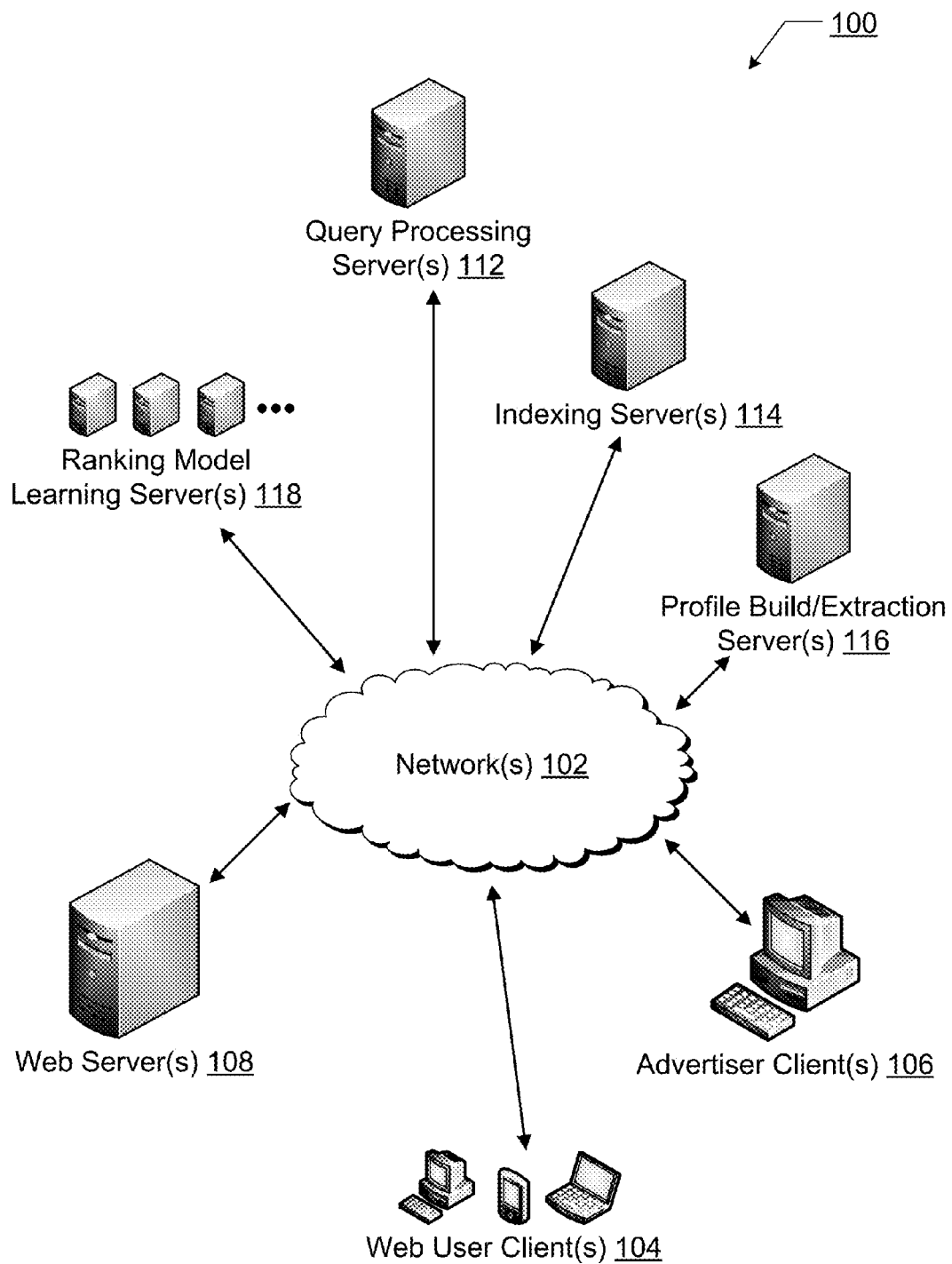
FIG. 1 is a schematic diagram depicting an example environment in which embodiments may operate.

Embodiments of the present invention provide advertisers and/or other entities greater flexibility in defining user segments for targeted advertising. This greater flexibility is achieved by building semantic profiles for users, indexing those semantic profiles to facilitate search queries, and ranking of semantic profile search results using a machine learning generated ranking model. In some embodiments, a dynamic profile is generated for one or more online users by extracting data regarding each user's online behavior, including but not limited to the user's search queries and web page views. Such data may be described as dynamic, given that it may change in response to the user's interests, moods, and/or activities from day to day. A semantic profile is then generated for the user through a correlation or other analysis of data in the user's dynamic profile. In some embodiments, the semantic profile may include information regarding domain, intent, preference, and/or habits for the user's online behavior. These types of data are further described herein.

In some embodiments, the semantic profile may be further based on a static user profile. The static profile may include demographic, geographic, or other information that is particular to the user, and that changes less frequently than dynamic data. The static profile may be generated by an external process or service (e.g., a social network, gaming, e-mail, messaging, and/or web portal service, or the like). Other information may be included in the semantic profile without deviating from the scope or spirit of the claimed invention.

In some embodiments, the semantic profile is indexed to facilitate an advertiser's (or other entity's) search over stored semantic profiles. Indexing may be based on information included in the semantic profile, such as domain, intent, preference, habit, demographic, and/or geographic information for the user. In some embodiments, updating and indexing of semantic profiles may be an ongoing process as additional behavioral data is received for the profiled users. In such cases, semantic profiles may be based on a shifting time window of data (e.g., the most recent month's worth of online behavior data). In some embodiments, generation, updating and indexing of semantic profiles is performed in an offline mode (e.g. through batch processing, periodically scheduled computing jobs, and the like).

Some embodiments further enable a search over the indexed semantic queries, to facilitate definition of a user segment for targeted advertising. Such a search may be performed by an advertiser or other entity seeking to define a particular user segment. In some embodiments, the query is a semantic query employing terms (e.g., domain, intent, preference, and habit) that are substantially similar to the various categories of data that make up the semantic profile. In some embodiments, semantic profiles resulting from the search may be ranked based on a measured degree of closeness between the terms of the semantic query and the resulting semantic profiles. Such ranking may be based on a ranking model that is developed through machine learning. This machine learning may be supervised or unsupervised. In some embodiments, supervised machine learning, e.g. using a support vector machine (SVM) method, is employed to create and maintain the ranking model. In some embodiments, the ranking model is created and maintained offline, whereas searches are performed and sets of semantic profiles resulting from the searches are ranked in an online mode (e.g. on-the-fly or dynamically as semantic queries are received).

Some embodiments may include one or more user interfaces provided to enable a semantic query to be specified by an advertiser or other entity. The semantic query may employ similar terms (e.g. semantic elements) to those data elements that form the semantic profile. Various user interfaces may also be provided to display the results of a search performed based on a semantic query. Generally, search results are presented in a ranked format (e.g. a list), and the ranking is performed based on a ranking model developed offline through a supervised machine learning process. Creation, updating and indexing of semantic profiles may also be performed offline, to enable a more efficient and/or timely response to semantic queries received from advertisers.

Embodiments may include a method or process performed by a computing device, computer readable storage media storing instructions that instruct a computing device to perform inventive actions, the computing device so instructed, and/or a system or environment in which the computing device operates. Such embodiments are exemplary, and other embodiments may be included in the claimed subject matter without deviating from the spirit of the invention described herein.

Illustrative Environment

FIG. 1 shows an example environment 100 in which embodiments operate. As shown, the various devices of environment 100 communicate with one another via one or more networks 102 that may include any type of networks that enable such communication. For example, networks 102 may include public networks such as the Internet, private networks such as an institutional and/or personal intranet, or some combination of private and public networks. Networks 102 may also include any type of wired and/or wireless network, including but not limited to local area networks (LANs), wide area networks (WANs), Wi-Fi, WiMax, and mobile communications networks (e.g. 3G, 4G, and so forth). Networks 102 may utilize communications protocols, including packet-based and/or datagram-based protocols such as internet protocol (IP), transmission control protocol (TCP), user datagram protocol (UDP), or other types of protocols. Moreover, networks 102 may also include a number of devices that facilitate network communications and/or form a hardware basis for the networks, such as switches, routers, gateways, access points, firewalls, base stations, repeaters, backbone devices, and the like.

Environment 100 further includes one or more web user client device(s) 104 associated with web user(s). Briefly described, web user client device(s) 104 may include any type of computing device that a web user may employ to send and receive information over networks 102. For example, web user client device(s) 104 may include, but are not limited to, desktop computers, laptop computers, pad computers, wearable computers, media players, automotive computers, mobile computing devices, smart phones, personal data assistants (PDAs), game consoles, mobile gaming devices, set-top boxes, and the like. Web user client device(s) 104 generally include one or more applications that enable a user to send and receive information over the web and/or internet, including but not limited to web browsers, e-mail client applications, chat or instant messaging (IM) clients, and other applications.

Environment 100 may also include one or more advertiser client device(s) 106. These advertiser client device(s) may be any of the computing device types listed above in the description of web user client device(s) 104, and generally include one or more applications that enable an advertiser to enter a semantic query to perform a search for semantic profiles, receive ranked results of the search, and/or select one or more semantic profiles to define a user segment for targeted advertising.

Although the party requesting a search for semantic profiles is generally described herein as an advertiser, the claimed invention is not so limited. The functionality described herein may be of advantage to other types of person and/or entities, including but not limited to market researchers, data aggregators, or virtually anyone seeking to analyze online user behavior for whatever purpose. Thus, the term advertiser as used herein encompasses any such user. Client computing devices, including web user client devices 104 and advertiser client devices 106, are described in further detail below, with regard to FIG. 2.

As shown, environment 100 may further include one or more web server(s) 108. Web server(s) 108, as well as the other types of servers 112, 114, 116 and 118 shown in FIG. 1, are described in greater detail herein with regard to FIG. 3. Briefly stated, web server(s) 108 include computing devices that are configured to serve content or provide services to users over network(s) 102. Such content and services includes, but is not limited to, hosted static and/or dynamic web pages, social network services, e-mail services, chat services, games, multimedia, and any other type of content, service or information provided over the web.

In some embodiments, web server(s) 108 may collect and/or store information related to online user behavior as users interact with web content and/or services. For example, web server(s) 108 may collect and store data for search queries specified by users using a search engine to search for content on the web. Moreover, web server(s) 108 may also collect and store data related to web pages that the user has viewed or interacted with, the web pages identified using an IP address, uniform resource locator (URL), uniform resource identifier (URI), or other identifying information. This stored data may include web browsing history, cached web content, cookies, and the like.

As further shown FIG. 1, environment 100 may include one or more query processing server(s) 112. Such servers may be configured to receive semantic queries entered by parties requesting a search for semantic profiles, including parties such as advertisers using advertiser client device(s) 106. Query processing server(s) 112 may also be configured to perform the search, rank the semantic profiles resulting from the search, and/or provide to the advertiser the ranked search results. In some embodiments, query processing server(s) 112 provide one or more user interfaces to enable an advertiser to request a search and/or view search results. Examples of such user interfaces are further described herein with regard to FIGS. 7 and 8A-8C.

Environment 100 may also include one or more indexing server(s) 114, configured to index semantic profiles to facilitate searches for semantic profiles. Environment 100 may further include one or more profile build/extraction server(s) 116. Such servers may be configured to extract dynamic user profiles from the online user behavior data (e.g. search query and page view information received from web server(s) 108). Profile build/extraction server(s) 116 may be further configured to build semantic user profiles. In some embodiments, a semantic user profile is built for a user based on an analysis (e.g. correlation) of user behavior data included in the dynamic user profile. Such analysis is described in greater detail below, with regard to FIG. 4.

As depicted, environment 100 also includes one or more ranking model learning server(s) 118. Generally, these servers are configured to create and maintain a ranking model used to rank the results of searches over semantic queries. In some embodiments, the ranking model is developed using supervised (e.g. employing a SVM technique) or unsupervised machine learning. However, other types of machine learning may be employed without deviating from the spirit or scope of the claimed invention. As depicted in FIG. 1, ranking model learning server(s) may be configured as a cluster of servers that share the various tasks related to learning the ranking model.

In some embodiments, various operations are performed in an offline mode, e.g. as a scheduled batch processing, an ongoing process, or the like. Such offline operations may include the creation and/or maintenance of the ranking model by ranking model server(s) 118, the extraction and building of dynamic and semantic profiles by profile build/extraction server(s) 116, and/or indexing of the semantic profiles by indexing server(s) 114. Such operations may be performed offline to enable more timely and/or efficient online processing of semantic queries, e.g. by query processing server(s) 112.

Although not explicitly depicted, environment 100 may further include one or more databases or other storage devices, configured to store data related to the various operations described herein. Such storage devices may be incorporated into one or more of the servers depicted, or may be external storage devices separate from but in communication with one or more of the servers. For example, user behavior data (e.g. search queries and page view information) may be stored in a database by web server(s) 108, and from there provided to profile build/extraction server(s) 116. Similarly, profile build/extraction server(s) 116 may also use a database to store static, dynamic, and/or semantic profiles for one or more users. Indexing server(s) 114 may access the stored semantic profiles to index them, and subsequently save the indexed semantic profiles in a database. Query processing server(s) 112 may access the indexed semantic profiles while performing searches based on semantic queries received from advertisers.

In general, each of the one or more of the servers depicted in FIG. 1 may include multiple computing devices arranged in a cluster, server farm, or other grouping to share workload. Such groups of servers may be load balanced or otherwise managed to provide more efficient operations. Moreover, although various computing devices of environment 100 are described as clients or servers, each device may operate in either capacity to perform operations related to various embodiments. Thus, the description of a device as client or server is provided for illustrative purposes, and does not limit the scope of activities that may be performed by any particular device.

Illustrative Client Device Architecture

Figure 2:
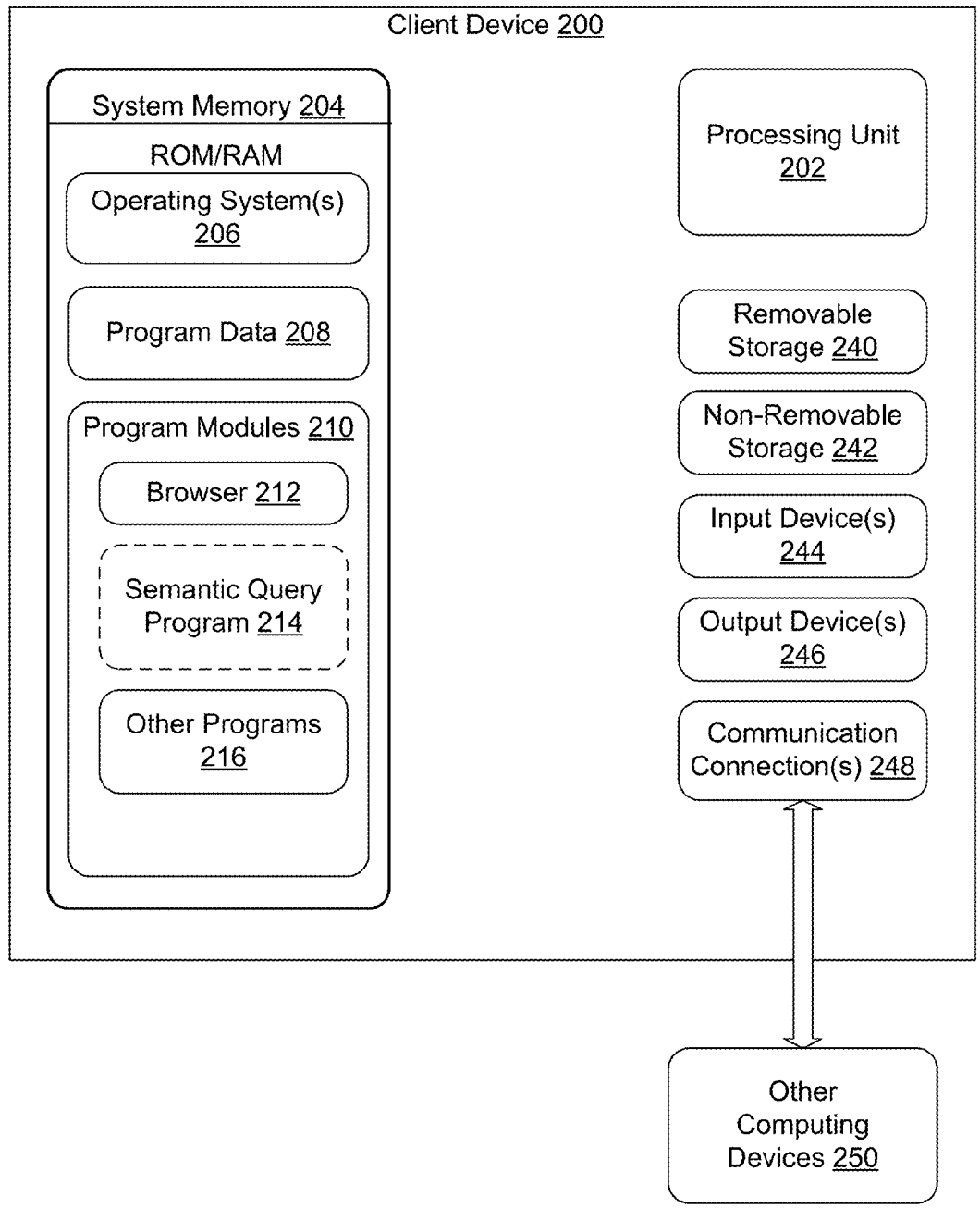
FIG. 2 is a diagram of an example computing device (e.g. client device) that may be deployed as part of the example environment of FIG. 1.

FIG. 2 depicts a block diagram for an example computer system architecture for web user client device(s) 104 and/or advertiser client device(s) 106, in accordance with various embodiments. As shown, client device 200 includes processing unit 202. Processing unit 202 may encompass multiple processing units, and may be implemented as hardware, software, or some combination thereof. Processing unit 202 may include one or more processors. As used herein, processor refers to a hardware component. Processing unit 202 may include computer-executable, processor-executable, and/or machine-executable instructions written in any suitable programming language to perform various functions described herein. In some embodiments, processing unit 202 may further include one or more graphic processing units (GPUs).

Client device 200 further includes a system memory 204, which may include volatile memory such as random access memory (RAM), static random access memory (SRAM), dynamic random access memory (DRAM), and the like. System memory 204 may also include non-volatile memory such as read only memory (ROM), flash memory, and the like. System memory 204 may also include cache memory. As shown, system memory 204 includes one or more operating systems 206, and one or more program modules 210, including programs, applications, and/or processes, that are loadable and executable by processing unit 202. System memory 204 may further store program data 208 that is generated and/or employed by program modules 210 and/or operating system 206 during their execution.

Program modules 210 include a browser application 212 (e.g. web browser) that allows a user to access web content and services. In some embodiments, program modules 210 may also include a semantic query program 214. This program may enable advertisers or other entities to specify a semantic query for searching semantic profiles, and may display search results. In some embodiments, this program is a client application that executes on a device such as advertiser client device(s) 106, and that communicates with query processing server(s) 112. In some embodiments, this functionality is provided to an advertiser as a web service, accessible to the advertiser through browser application 212. Program modules 210 may further include other programs 216.

As shown in FIG. 2, client device 200 may also include removable storage 240 and/or non-removable storage 242, including but not limited to magnetic disk storage, optical disk storage, tape storage, and the like. Disk drives and associated computer-readable media may provide non-volatile storage of computer readable instructions, data structures, program modules, and other data for operation of client device 200.

In general, computer-readable media includes computer storage media and communications media.

Computer storage media includes volatile and non-volatile, removable and non-removable media implemented in any method or technology for storage of information such as computer readable instructions, data structure, program modules, and other data. Computer storage media includes, but is not limited to, RAM, ROM, erasable programmable read-only memory (EEPROM), SRAM, DRAM, flash memory or other memory technology, compact disc read-only memory (CD-ROM), digital versatile disks (DVDs) or other optical storage, magnetic cassettes, magnetic tape, magnetic disk storage or other magnetic storage devices, or any other non-transmission medium that can be used to store information for access by a computing device.

In contrast, communication media may embody computer readable instructions, data structures, program modules, or other data in a modulated data signal, such as a carrier wave or other transmission mechanism. As defined herein, computer storage media does not include communication media.

Client device 200 may include input device(s) 244, including but not limited to keyboard, mouse, pen, voice input device, touch input device, and the like. Client device 200 may further include output device(s) 246 including but not limited to a display, printer, audio speakers, and the like. Client device 200 may further include communications connection(s) 248 that allow client device 200 to communicate with other computing devices 250, including server devices, databases, or other computing devices available over network(s) 102.

Illustrative Server Device Architecture

Figure 3:
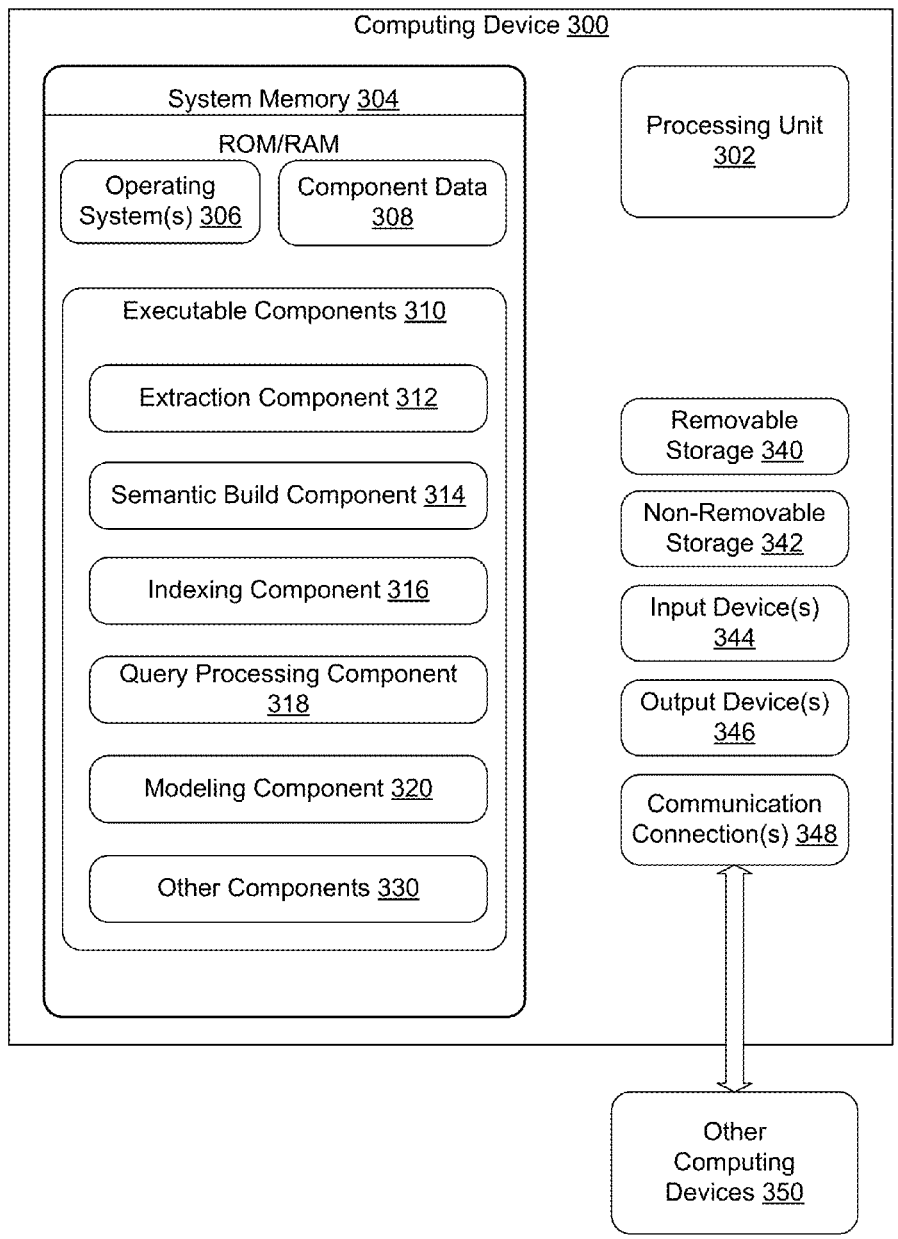
FIG. 3 is a diagram of an example computing device (e.g. server device) that may be deployed as part of the example environment of FIG. 1.

FIG. 3 depicts a block diagram for an example computer system architecture for various server device depicted in FIG. 1. As shown, computing device 300 includes processing unit 302. Processing unit 302 may encompass multiple processing units, and may be implements as hardware, software, or some combination thereof. Processing unit 302 may include one or more processors. As used herein, processor refers to a hardware component. Processing unit 302 may include computer-executable, processor-executable, and/or machine-executable instructions written in any suitable programming language to perform various functions described herein. In some embodiments, processing unit 302 may further include one or more graphic processing units (GPUs).

Computing device 300 further includes a system memory 304, which may include volatile memory such as random access memory (RAM), static random access memory (SRAM), dynamic random access memory (DRAM), and the like. System memory 304 may further include non-volatile memory such as read only memory (ROM), flash memory, and the like. System memory 304 may also include cache memory. As shown, system memory 304 includes one or more operating systems 306, and one or more executable components 310, including components, programs, applications, and/or processes, that are loadable and executable by processing unit 302. System memory 304 may further store program data 308 that is generated and/or employed by program modules 310 and/or operating system 306 during their execution.

Executable components 310 include one or more of various components to implement functionality described herein, on one or more of the servers depicted in FIG. 1. For example, executable components 310 may include extraction component 312, configured to extract user behavior data and generate a dynamic profile. Executable components 310 may further include semantic build component 314 to build a semantic profile based on a dynamic profile and/or static profile, and indexing component 316 to index one or more semantic profiles to facilitate search operations. Executable components 310 may also include query processing component 318, operative to receive a semantic query specified by an advertiser, execute the semantic query against a collected of indexed semantic profiles, and provide the results of the semantic query.

Executable components may further include modeling component 320 that performs actions for creating and maintaining a ranking model for use in ranking semantic profiles output from a search based on a semantic query. As described further herein, in some embodiments modeling component 320 may employ machine learning (e.g., supervised or unsupervised) to develop a ranking model. Executable components 310 may further include other components 330.

As shown in FIG. 3, computing device 300 may also include removable storage 340 and/or non-removable storage 342, including but not limited to magnetic disk storage, optical disk storage, tape storage, and the like. Disk drives and associated computer-readable media may provide non-volatile storage of computer readable instructions, data structures, program modules, and other data for operation of computing device 300.

In general, computer-readable media includes computer storage media and communications media.

Computer storage media includes volatile and non-volatile, removable and non-removable media implemented in any method or technology for storage of information such as computer readable instructions, data structure, program modules, and other data. Computer storage media includes, but is not limited to, RAM, ROM, erasable programmable read-only memory (EEPROM), SRAM, DRAM, flash memory or other memory technology, compact disc read-only memory (CD-ROM), digital versatile disks (DVDs) or other optical storage, magnetic cassettes, magnetic tape, magnetic disk storage or other magnetic storage devices, or any other non-transmission medium that can be used to store information for access by a computing device.

In contrast, communication media may embody computer readable instructions, data structures, program modules, or other data in a modulated data signal, such as a carrier wave or other transmission mechanism. As defined herein, computer storage media does not include communication media.

Computing device 300 may include input device(s) 344, including but not limited to keyboard, mouse, pen, voice input device, touch input device, and the like. Computing device 300 may further include output device(s) 346 including but not limited to a display, printer, audio speakers, and the like. Computing device 300 may further include communications connection(s) 348 that allow computing device 300 to communicate with other computing devices 350, including client devices, server devices, databases, or other computing devices available over network(s) 102.

Illustrative Processes

Figure 4:
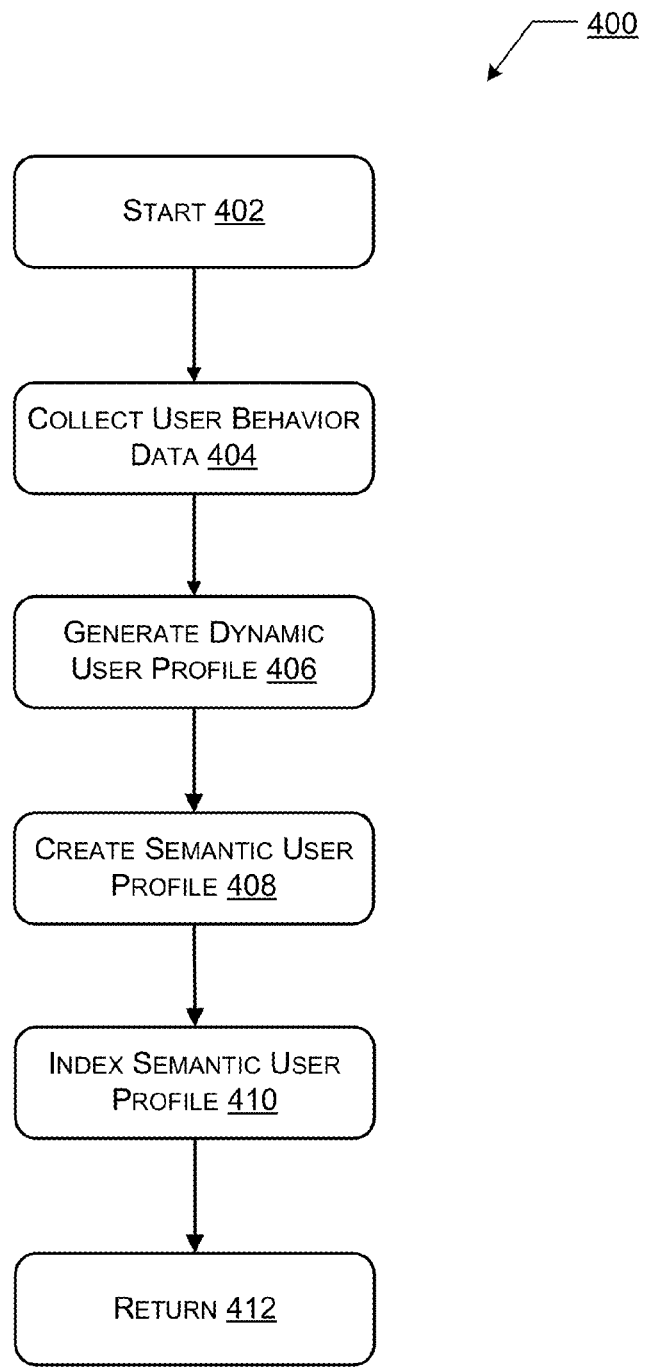
FIG. 4 is a flow diagram of an illustrative process for creating and indexing semantic user profiles.
Figure 5:
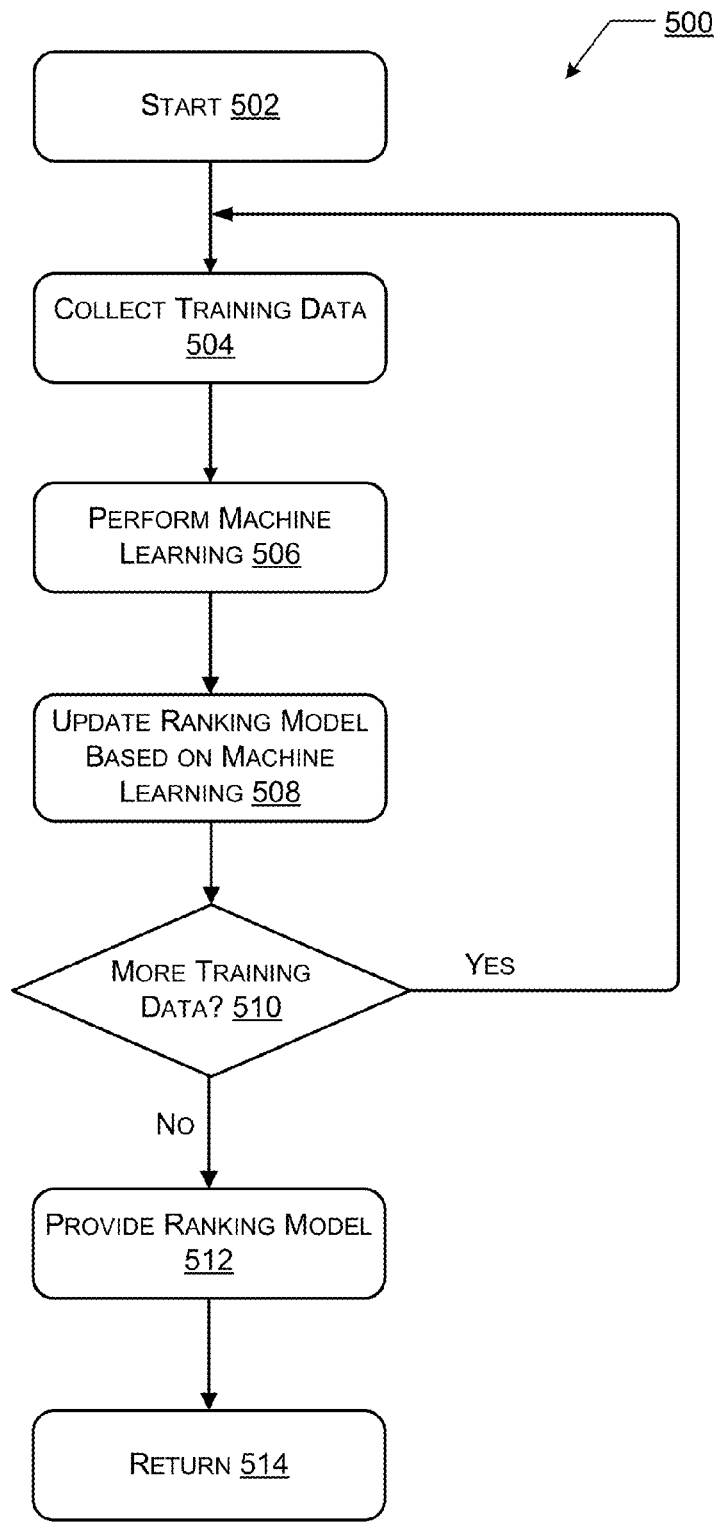
FIG. 5 is a flow diagram of an illustrative process for providing a ranking model.
Figure 6:
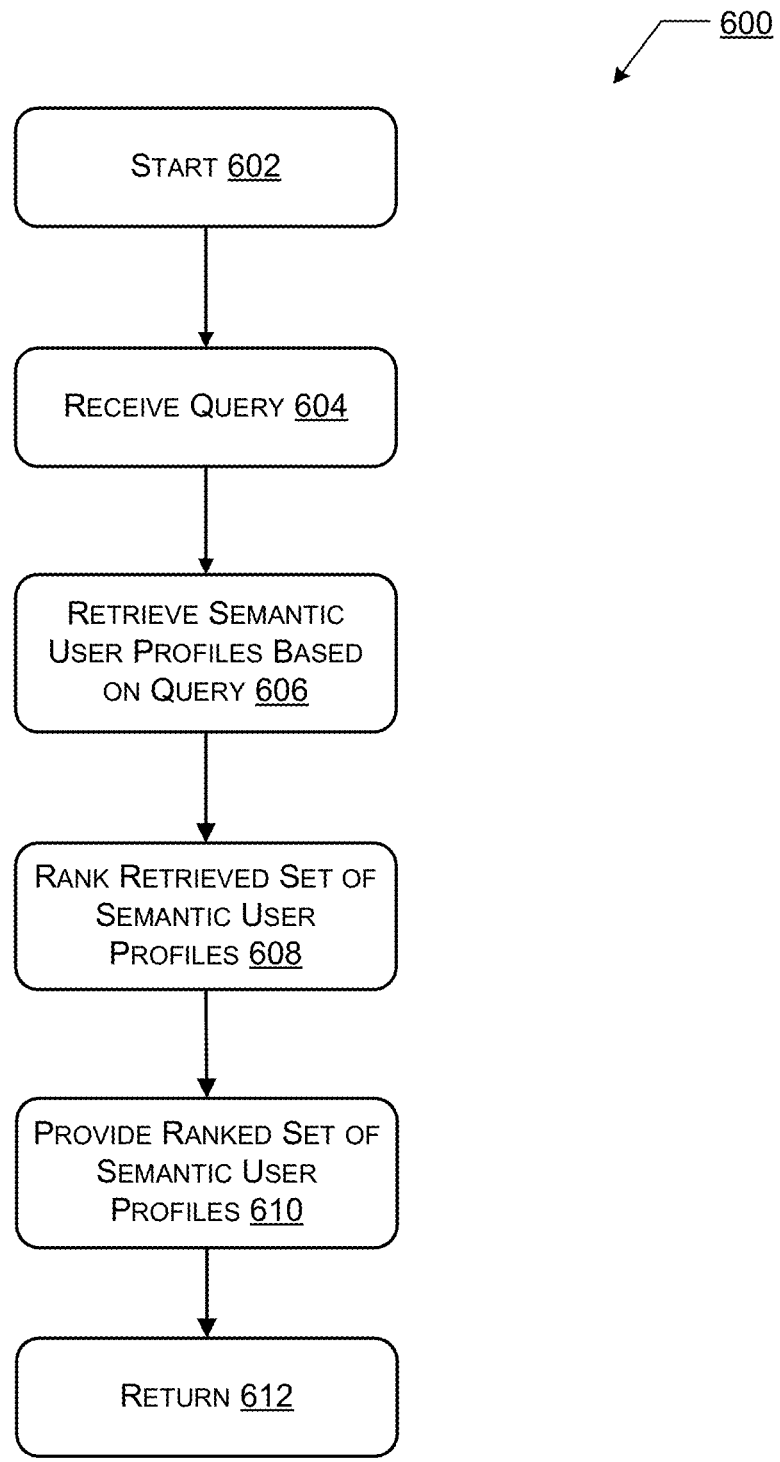
FIG. 6 is a flow diagram of an illustrative process for processing a semantic query.

FIGS. 4-6 depict flowcharts showing example processes in accordance with various embodiments. The operations of these processes are illustrated in individual blocks and summarized with reference to those blocks. The processes are illustrated as logical flow graphs, each operation of which may represent a set of operations that can be implemented in hardware, software, or a combination thereof. In the context of software, the operations represent computer-executable instructions stored on one or more computer-readable storage media that, when executed by one or more processors, enable the one or more processors to perform the recited operations. Generally, computer-executable instructions include routines, programs, objects, modules, components, data structures, and the like that perform particular functions or implement particular abstract data types. The order in which the operations are described is not intended to be construed as a limitation, and any number of the described operations can be combined in any order and/or in parallel to implement the process.

FIG. 4 depicts an example process 400 for generating and indexing semantic profiles, according to embodiments. Process 400 executes on a computing device such as profile build/extraction server(s) 116 and/or indexing server(s) 114. After a start block 402, process 400 proceeds to 404 where user behavior data is collected. Generally, such user behavior data includes data regarding the behavior of one or more users online. User behavior data may include information on search queries entered by users into a search engine to search the web (e.g. search query data). User behavior data may also include information on the web pages that users have viewed (e.g. page view data), identified using an IP address, URL, URI or some other identifier.

In some embodiments, user behavior data may be received from multiple sources including page view logs of web sites, query logs of search engines, external data aggregators or resellers, and/or other sources. For example, user behavior data may be gathered and/or stored by one or more of the web servers 108, and provided as a data stream to process 400. In some embodiments, a certain time slice of user behavior data is stored and used by process 400. User behavior data for each day may be stored separately, and process 400 may employ a predefined number of day-slices worth of data for further processing (e.g., the most recent 30 days worth of data).

In some embodiments, users have the option to opt out of having their user behavior data collected, in accordance with a data privacy policy implemented on one or more of web servers 108, on profile build/extraction server 116, or some other device. Such opting out allows the user to specify that no user behavior data is collected regarding the user, or that a subset of the behavior data is collected for the user. In some embodiments, a user preference to opt out may be stored on a server, or indicated through information saved on the user's client device (e.g. through a cookie or other means). Moreover, some embodiments may support an opt-in privacy model, in which online behavior data for a user is not collected unless the user explicitly agrees.

At block 406, a dynamic user profile is automatically generated for one or more online users. The dynamic user profile for a user includes the dynamic user behavior data received regarding that user, and is generated by extracting that user's behavior data from the received stream of user behavior data. In some embodiments, this extraction includes searching the user behavior data for data that is associated with a particular user identifier for the user, such as a personal name, identifier number, login, game console tag, or some other identifier for the user. In some embodiments, the user identifier may uniquely identify the user. As discussed above, this data is not extracted if the user has opted out in accordance with a data privacy policy.

At block 408, a semantic user profile is automatically created for one or more users. A semantic user profile is created for each user based on an analysis (e.g. a correlation) of user behavior data stored in that user's dynamic profile. In some embodiments, the semantic user profile is further based on information from one or more static profiles for the user. Such static profiles may include geographic, demographic, and/or other information particular to the user. Such information may be described as more static, in that it changes less frequently than the more dynamic data includes in the online user behavior data. In some embodiments, static profile(s) may be generated, maintained, and/or stored by processes or services that are separate from or external to process 400, such as a social network, a gaming account, a e-mail account, a web portal account, an e-commerce site account, or other online service.

Semantic profiles include data regarding domain, intent, preference, and/or habits that are inferred for the user based on the online behavior of the user. As used herein, DOMAIN is a particular category of product or service in which the user has indicated an interest through search queries, page views or other online behavior. For example, if the user behavior data for a user includes a web search query for "used cars" and/or a page view of a web site "http://www.carscarscars.xyz," it may be inferred that the user has an interest in cars. Thus, the semantic profile for the user may include an element DOMAIN="car."

As used herein, INTENT indicates a particular intent of the user with regard to a DOMAIN. For example, if user behavior data includes a web search query for "automotive repair" and/or a page view of a web site "http://localcarrepair.xyz," then the semantic profile for a user may include an elements DOMAIN="car" and INTENT="repair." Alternatively, if the user behavior data contains evidence that the user is searching for pricing and/or availability information for particular cars, an element INTENT="purchase" may be inferred for the user and saved into the user's semantic profile.

As used herein, PREFERENCE indicates a sub-category or modification of DOMAIN information for the user. For example, if user behavior data for a user includes a web search query for "used cars" and/or a page view of a web site "http://usedcars.xyz," it may be inferred that the user has an interest in used cars. The semantic profile for the user may then include DOMAIN="car" and PREFERENCE="used car." Preference may also include a user's preference for a particular brand (e.g., company, manufacturer, provider, distributor, or the like) of the product or service specified by domain.

In some embodiments, semantic profiles may further include habit information for users. As used herein, HABIT indicates temporal, geographic, and/or other contextual information related to the inferred interests of a user. For example, user behavior data may indicate that a user tends to search for information on used cars on weekday evenings given the user's particular time zone. In that case, the semantic profile for the user may include elements for DOMAIN="car," PREFERENCE="used car," and HABIT="weekday evening." In another example, user behavior data may indicate that a user often browses theater ticket web sites when she visits New York City. In that case, the semantic profile for the user may include elements for DOMAIN="live theater," and HABIT="New York City, N.Y., USA."

Habit information may further include DWELLTIME, a measure of the length of time the user spent viewing a web page and/or viewing results of a web query. In this way, DWELLTIME provides an indication of the user's strength of interest in a particular DOMAIN, INTENT, and/or PREFERENCE. For example, a user who spends 300 seconds viewing a web page may have a stronger interest in the contents of that page than a user who spends five seconds viewing the page.

In this way, the elements DOMAIN, INTENT, PREFERENCE, and/or HABIT form a semantic framework that may be used to describe user interests that are inferred from the user's online behavior. This semantic framework is also used by an advertiser (or other party) who specifies a semantic query to search for semantic profiles containing particular DOMAIN, INTENT, PREFERENCE, HABIT, and/or other information. Semantic queries are described further herein with regard to FIG. 6.

Returning to FIG. 4, at block 410 one or more semantic user profiles may be indexed to facilitate search operations. In some embodiments, semantic profiles are indexed by a dedicated server or cluster of servers such as indexing server(s) 114. In some embodiments, indexing takes place on the same server or cluster of servers that builds the semantic profile, such as profile build/extraction server(s) 116. An index is a data structure that facilitates search of and data retrieval from semantic profiles, created using one or more data elements of the semantic profiles (e.g. DOMAIN, INTENT, PREFERENCE, and/or HABIT).

In some embodiments, indexing may include constructing a data matrix for all or a subset of users, such that each row of the matrix corresponds to a user, and each column of the matrix is a particular data element from the semantic profile (e.g. DOMAIN, INTENT, etc.) and/or static profile (e.g., demographic or geographic information). In some cases, this matrix may be relatively sparse in that less data may be available for some users than for other users. For example, for some users demographic and geographic information may be available, but little user behavior data is available to infer domain, intent, preference and/or habit information. Other users may have generated a greater amount of online user behavior data such that domain, intent, preference and/or habit can be more reliably inferred. In cases where the matrix is sparse, one or more methods may be used to reduce the sparseness prior to indexing. For example, a min-hash method or other dimension reduction method may be used to generate a denser matrix of data prior to indexing.

In some embodiments, the indexing process may be made faster or more efficient using one or more techniques. For example, the indexing process may be performed in parallel by multiple devices to enable faster indexing of large numbers of semantic user profiles. Further, in some embodiments indexing may be made faster using an inverted index for first order log operations, such that indexing is performed by searching on a particular column (e.g. domain) of the data matrix instead of by searching on a particular row (e.g. a user).

In some embodiments, the indexing process may employ a map/reduce framework to handle large amounts of received user behavior data incorporated into semantic user profiles. In such cases, the indexing process may build an inverted index for any of the data elements of the semantic profiles, including data elements from static user profiles (e.g. location, demographic, and so forth), and/or data elements from dynamic user profiles (e.g. domain, intent, preference, habit, and so forth).

For example, to build an inverted index based on the INTENT element of semantic profiles, the indexing process may first get a list of <user, intent> pairs by analyzing semantic profiles. Then, the indexing process maps this list to a list of <intent, user> pairs, and reduces this list using intent as a key. In this reduction step, the <intent, user> pairs are sorted by intent and pairs with the same intent are merged as <intent1, user1, user2 . . . > (e.g., where user1, user2 . . . include those users who have shown intent1 in their online behavior). Finally, the indexing process builds the inverted index as a data structure where each row is a different intent that is associated with the various users who have expressed that intent in their user behavior, e.g. {<intent1, user1, user2 . . . >, <intent2, user2, user4 . . . > . . . }. Thus, an online search can more easily retrieve a set of users who have shown a particular intent.

In some embodiments, semantic profiles and their indexes may be updated in an ongoing process as additional dynamic user behavior data is received. Creation, updating, and/or indexing of semantic profiles may be performed in an offline process (e.g. through batch processing, periodically scheduled computing jobs, background tasks, and the like). Such offline processing enables faster and more efficient online processing of semantic queries from advertisers. At block 412, process 400 returns.

FIG. 5 is a flow diagram of an illustrative process 500 for providing a ranking model, according to embodiments. Process 500 executes on a computing device such as ranking model learning server(s) 118. FIG. 5 illustrates at least one embodiment in which a ranking model is developed through supervised machine learning employing training data (e.g. through a SVM method). However, the claimed invention is not so limited and the ranking model may also be developed using unsupervised machine learning or some other technique. In some embodiments, machine learning to develop the ranking model occurs in an offline mode, to enable more efficient online processing of semantic queries from advertisers.

After a start block 502, process 500 proceeds to collect training data at block 504. Training data is collected from the data of semantic profiles and from certain received semantic queries, based on a determination that certain semantic queries are relevant to certain users. Once such a determination is made, the data is labeled as training data and used to further learn the ranking model. In some embodiments, training data consists of pairs of semantic profile data and semantic query data that have been determined to be suitable for use in the supervised machine learning.

In general, two methods may be used for collecting training data. In one method, explicit feedback may be used to identify training data. In this method, an editor may manually examine each of one or more semantic queries, and compare the query to the semantic profiles that resulted from that query. In cases where the editor determines that a result profile is relevant to the semantic query, the editor may label that pair of semantic profile and semantic query as training data.

In another method, implicit feedback may be used to identify training data. In some embodiments, this implicit feedback method employs data from an ad click-through log. First, a semantic query is mapped to a group of advertisements that are relevant to the semantic query. In some cases, this mapping may be based at least in part on those advertisements where the associated advertisers have bid on, or otherwise expressed an interest in, one or more keywords of the semantic query, such that users who enter a query containing the keyword are shown the advertisement. Second, after the semantic query is mapped to one or more advertisements, those users who have been shown at least one of these advertisements are identified as candidates.

Third, these candidates are then evaluated based on how relevant each one is to the advertisements (and therefore to the semantic query). In some embodiments, this relevance may be based on each candidate's behavior with regard to one or more of the advertisements. For example, if a candidate user clicked on at least one of the ads and the dwell time was at least five seconds, the candidate may be deemed strongly relevant to the query. If the candidate clicked on at least one of the ads, but had a shorter dwell time on the ad, the candidate may be deemed only somewhat relevant (e.g. medium relevance) to the query. If a candidate had more than five ad impressions (e.g., was shown more than five of the ads) but did not click on any of them, the user may be considered to be less relevant or irrelevant.

Finally, these relevant determinations are used to decide which candidates are included in the training data. For example, in some embodiments semantic user profiles for the strongly relevant candidates are included in the training data, along with the semantic query used in the first step to identify the advertisements. Various embodiments may use one or both of the explicit and implicit feedback methods to identify a set of training data. Following collection of training data, machine learning may proceed at block 506. In some embodiments, machine learning is based on the SVM technique.

At block 508, the ranking model is updated based on the machine learning. In some embodiments, after an advertiser specifies a semantic query for searching over semantic profiles of users, search results are presented to the advertiser as an ordered list of users, ranked according to the ranking model. In such cases, the rank represents a closeness or a relevancy measure between the semantic profiles and the search terms specified by the advertiser in the semantic query, e.g. more relevant semantic profiles are ranked higher in the search results.

At block 510, a determination is made whether more training data is available for use in developing the ranking model.

If so, process 500 returns to block 504. If not, process 500 proceeds to block 512 where the ranking model is provided to a device that receives and processes semantic query requests from advertisers (e.g. query processing server(s) 112). Such a device employs the ranking model to rank results of searches based on semantic queries. At block 514, process 500 returns.

FIG. 6 is a flow diagram of an illustrative process 600 for processing a semantic query, according to embodiments. Process 600 executes on a computing device such as query processing server(s) 112. After a start block 602, process 600 receives a search query at block 604. As described herein, the received search query is a semantic query specified by an advertiser using one or more semantic terms including but not limited to domain, intent, preference, and/or habit. The semantic query can also include search terms for demographic and geographic user information, and other information, as well as one or more logical operators (e.g., AND, OR, NOT, XOR, and so forth) to relate search terms to one another. For example, the user may specify a semantic query with terms: DOMAIN="car" AND INTENT="purchase" AND REGION="united states west coast" to find a set of users who have, through their online behavior, expressed an interest in purchasing a car and who live in the specified region.

Having received the semantic query, process 600 may proceed to block 606 where one or more semantic profiles are retrieved that satisfy the semantic query. At block 608, the retrieved semantic profiles are ranked based on the ranking model described herein with regard to FIG. 5. At block 610, the ranked set of semantic user profiles are provided to the advertiser (or other party) who specified the semantic query and requested the search.

In general, ranking enables semantic profiles that are more relevant and/or correspond more closely to one or more terms of the semantic query to be placed higher in the list of search results. Thus, an advertiser may choose the top ranked X number of semantic profiles in the results to form a user segment for a particular advertising campaign. More frequent activity of a user with regard to a particular DOMAIN, INTENT, PREFERENCE, and/or HABIT may lead to a higher ranking for that user's semantic profile. For example, a user who viewed a used car sale web site 20 times may be ranked higher than another user who viewed the site two times, in the results of a query including terms DOMAIN="car" and PREFERENCE="used." Process 600 returns at block 612.

In some embodiments, social network data may also be employed in the ranking process, to help refine and/or expand a user segment. Social network data may include information on relationships between users, and may include relationships at various degrees of separation (e.g. direct acquaintances, friends of friends, friends of friends of friends, etc.). Social network data may also include information regarding the strength of relationships between users.

In general, three types of relationships are examined— close relationships, casual acquaintances, and connections without personal acquaintance. Close relationships to a user may include a user's close friends, family members, or people who in some way have more intimate knowledge of the user's interests and/or activities. Casual acquaintances may include those who are personally known to the user in a less intimate way, such as business acquaintances, fellow organization members, and the like. The third category includes those people who are connected to the user in some way but who have no personal interaction. For example, if the user comments on an online blog posting, product review, article, or the like, the user may be connected to the author of the writing even though they are not personally acquainted.

In some embodiments, semantic profiles resulting from a search are ranked or otherwise weighted based at least in part on social network information. For example, a semantic query for DOMAIN="car" and PREFERENCE="xbrand" may result in a list of ten semantic profiles that match the query, with user Ted ranked eighth in the list. Further, social network information may indicate that Ted has a close personal relationship with Sue (e.g. his sister). If user behavior data for Sue indicates that Sue has a very strong interest in xbrand cars, Ted's ranking in the list may be increased based on an assumption that he may be more influenced by advertisements for that particular brand of car. In this way, a user segment may be refined, expanded, or otherwise modified based on known social network information for users within the segment.

In some embodiments, different modes may be provided to an advertiser to facilitate search. For example, an advertiser to choose to search in a semantic mode using semantic terms DOMAIN, INTENT, etc. as described above. Some embodiments may further provide a keyword mode, enabling an advertiser to specify particular keywords to directly search user behavior data. For example, an advertiser may specify a particular URL to find users who have viewed the web page identified by the URL. In some embodiments, an advertiser may specify a search in a combined mode that incorporates both semantic and keyword modes.

Illustrative User Interfaces

FIGS. 7 and 8A-8C show example user interfaces in accordance with embodiments. These user interfaces depict exemplary user interface elements such as displays, text boxes, buttons, menus, lists, and so forth. Thus, the particular elements depicted and their arrangement are not intended to be limiting, and other elements, arrangements, designs may be employed without departing from the scope or spirit of the claimed invention. In some embodiments, such user interfaces may be provided by a computing device such as query processing server(s) 112 and accessible from another computing device (e.g. a client device such as advertiser client(s) 106). In some embodiments, the user interfaces may be part of one or more dedicated client applications running on a client device (e.g. semantic query program 214).

Figure 7:
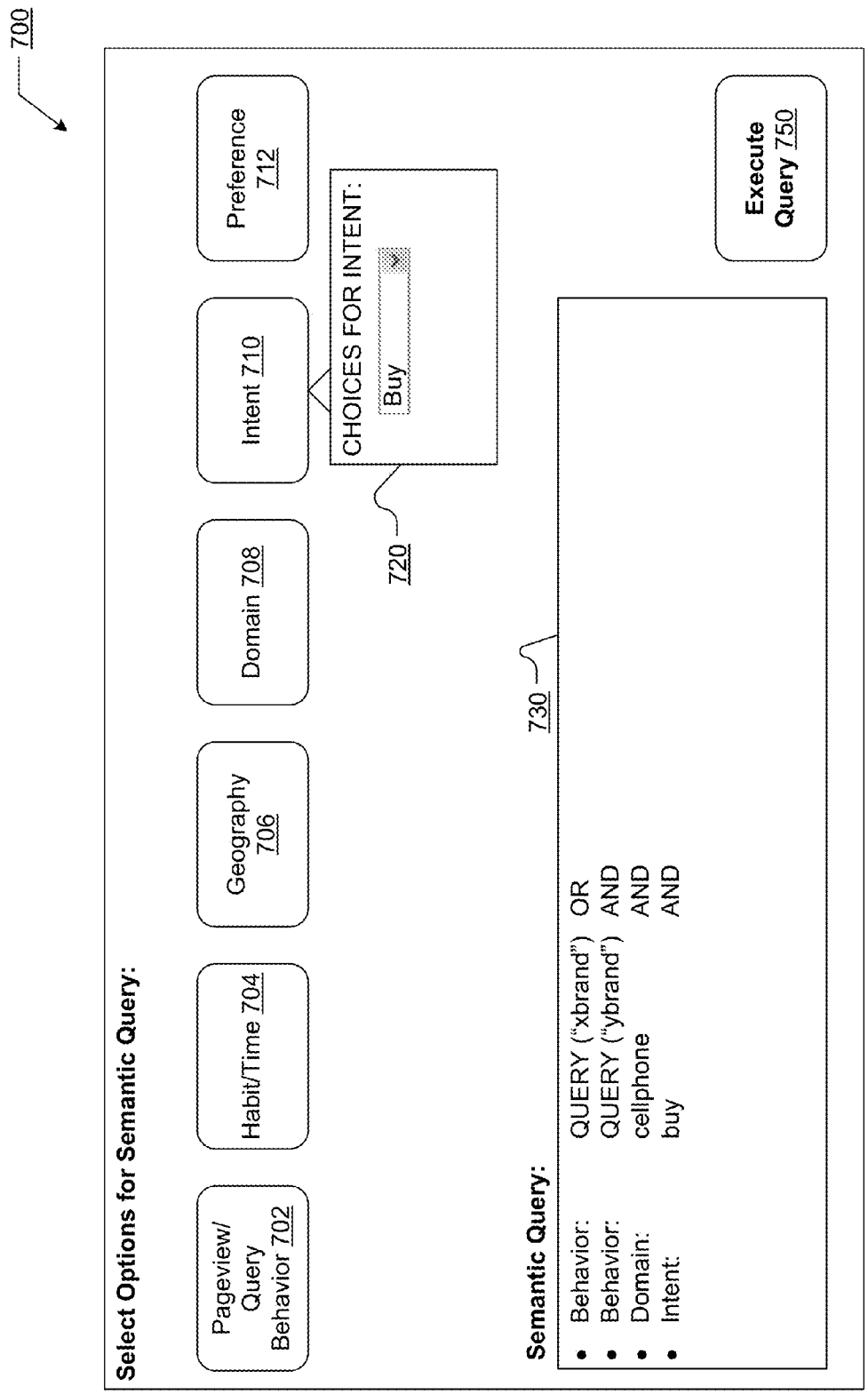
FIG. 7 is depicts an example user interface for entering a semantic query.

FIG. 7 depicts an example user interface 700 for the specification of a semantic query to be used to search for semantic user profiles, as discussed herein. As depicted, user interface 700 includes various controls that allow an advertiser or other entity to specify a semantic query. Pageview/query behavior control 702 enables an advertiser to specify search terms for user behavior (e.g. search queries and/or pages viewed by the user online). Habit/time control 704 enables an advertiser to specify search terms for user habit, including times of day, weeks, months, years for particular behavior, or other contextual information. Geography control 706 allows an advertiser to input particular search terms related to location information for the user. This may include location-related habits (e.g. where the user is when he/she engages in certain online behavior) and/or static geographic information for the user (e.g. location of the user's home, work, and the like). Domain control 708, intent control 710, and preference control 712 enable an advertiser to input search terms related to semantic elements domain, intent and preference as described herein.

As an example of how such controls might be implemented, FIG. 7 shows a pop-up menu 720 that may be displayed when an advertiser selects a control, in this case intent control 710. As shown, menu 720 displays a list of choices to the advertiser for specifying an INTENT search term (e.g., "buy," "rent," "sell," "repair" and so forth). Once the advertiser selects an option from the list, the search term may be added to the semantic query displayed in pane 730.

As the advertiser constructs a semantic query, the query is displayed to the advertiser in pane 730 as a series of search terms related by logical operators. Though not depicted, user interface 700 may include one or more controls to allow the advertiser to choose from a list of logical operators (e.g., AND, OR, XOR, NOT, etc.) when constructing a semantic query. User interface 700 further includes an Execute Query control 750 to enable to advertiser to request that the specified query be executed.

In some embodiments, intelligent query suggestion techniques may be employed to suggest possible query terms to an advertiser. For example, if the advertiser enters a query term DOMAIN="car," a suggestion of an additional term INTENT="buy" may be made automatically. In this way, embodiments may facilitate ease of use, particularly for those less experienced advertisers who are unfamiliar with keyword-based methods for defining a user segment.

In some embodiments, semantic terms DOMAIN, INTENT, PREFERENCE, and/or HABIT are related to one another, such that certain options are available under one term based on the choice of an option for another term. For example, if an advertiser specifies DOMAIN="car" as a search term, then the list of available options for INTENT may include possible user intents related to cars such as buying, selling, renting, repairing, and so forth. However, if an advertiser specifies DOMAIN="book," a different list of INTENT options may be made available, such as buying, selling, borrowing, trading, and so forth. Thus, the choice of a particular option for one term may constrain the options available for other terms. In some embodiments, available options for the various semantic terms may be stored as lists or the like in one or more knowledge bases in a database or other storage, and made available to the exemplary processes and user interfaces described herein.

In some embodiments, an advertiser may be given an option to specify a broad search or a more exact search for the query terms. For example, a user's request of a broad match may lead to a search being performed on the particular query terms specified (e.g. DOMAIN="car") as well as terms that are semantically similar to the specified terms (e.g. DOMAIN="automobile," "vehicle," etc.). A user's request of an exact match may lead to a more limited search based on the specified terms.

Figure 8A:
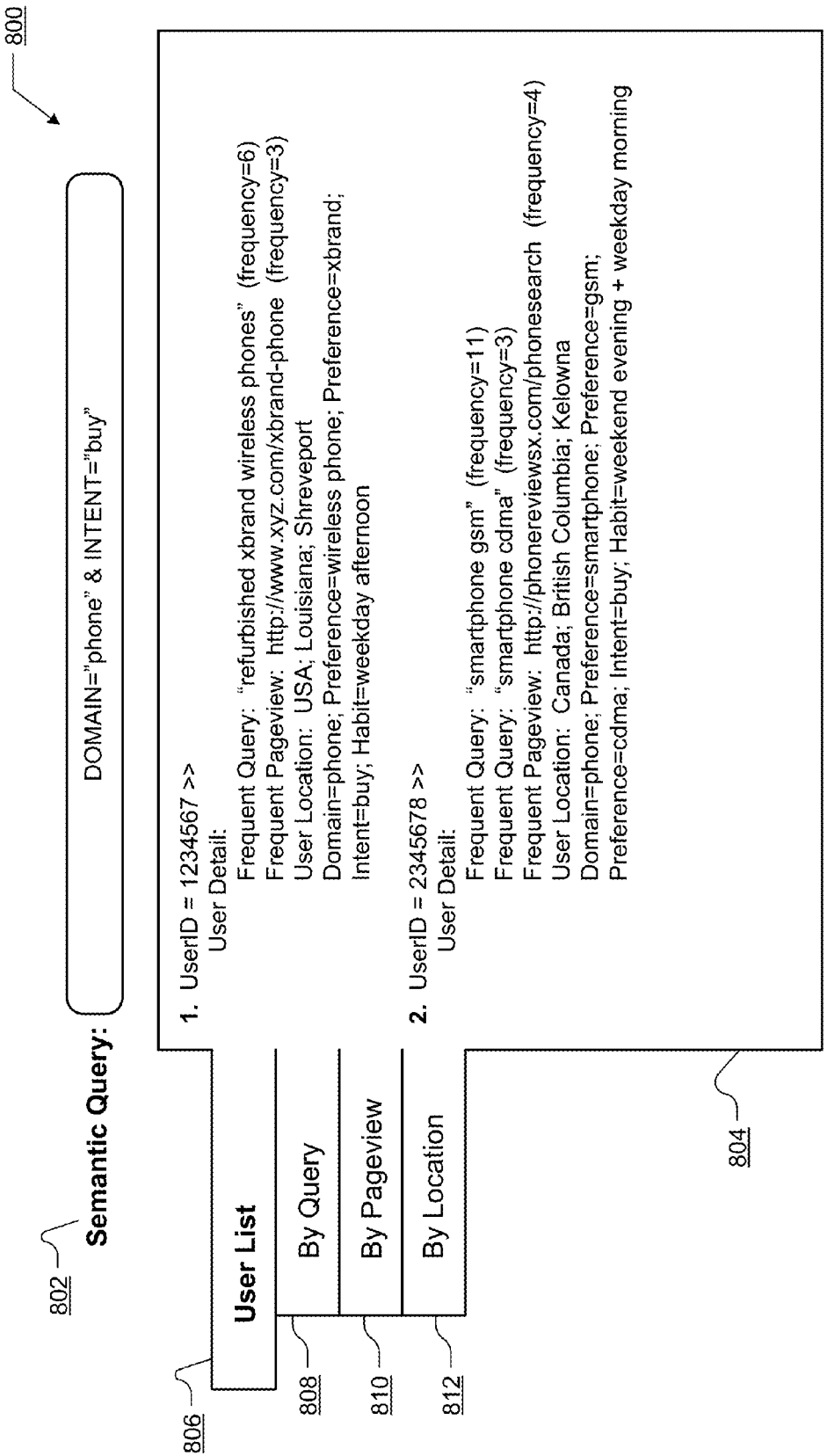
FIGS. 8A-8C depict an example user interface for viewing results of a semantic query.
Figure 8B:
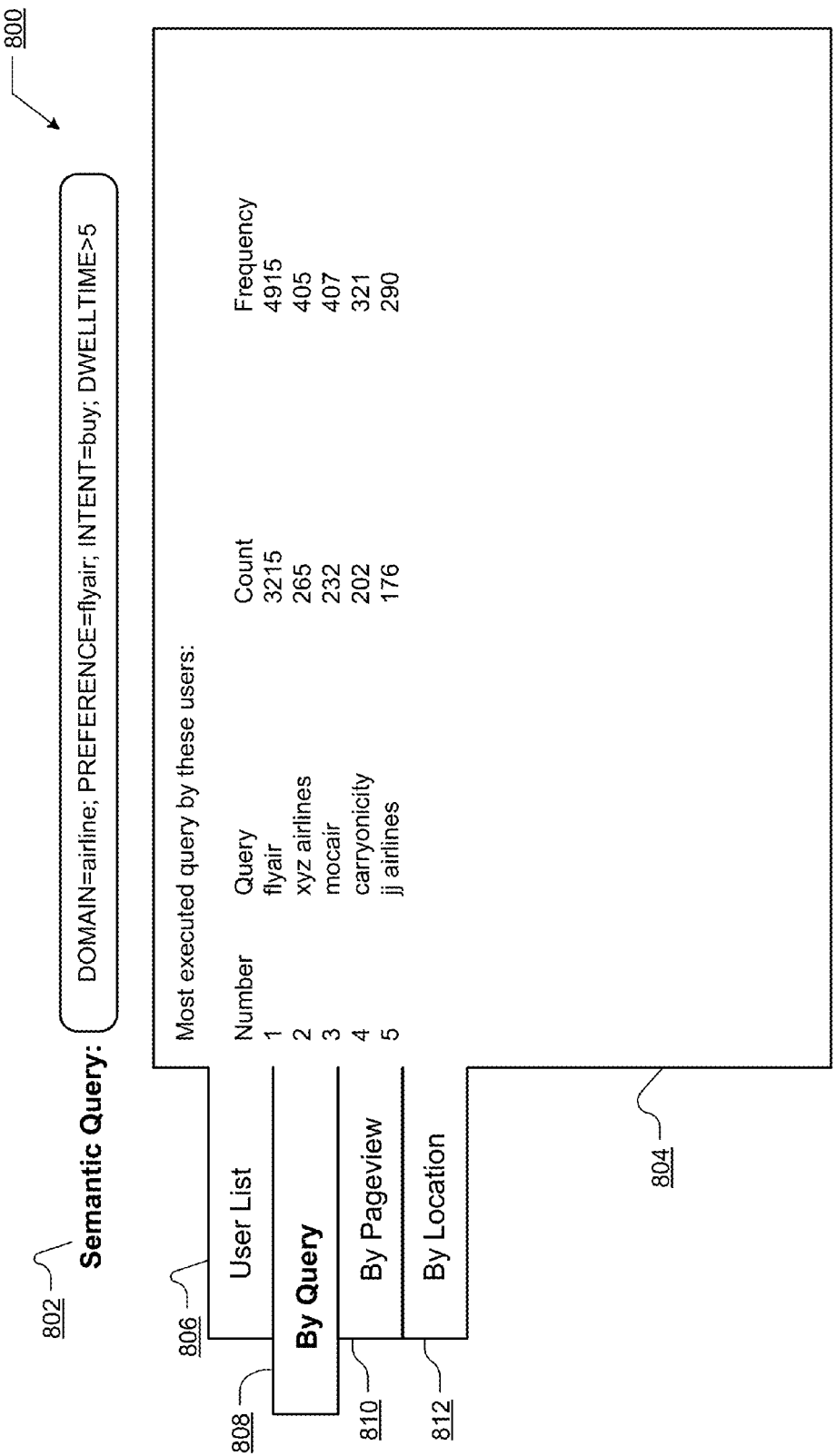
Figure 8C:
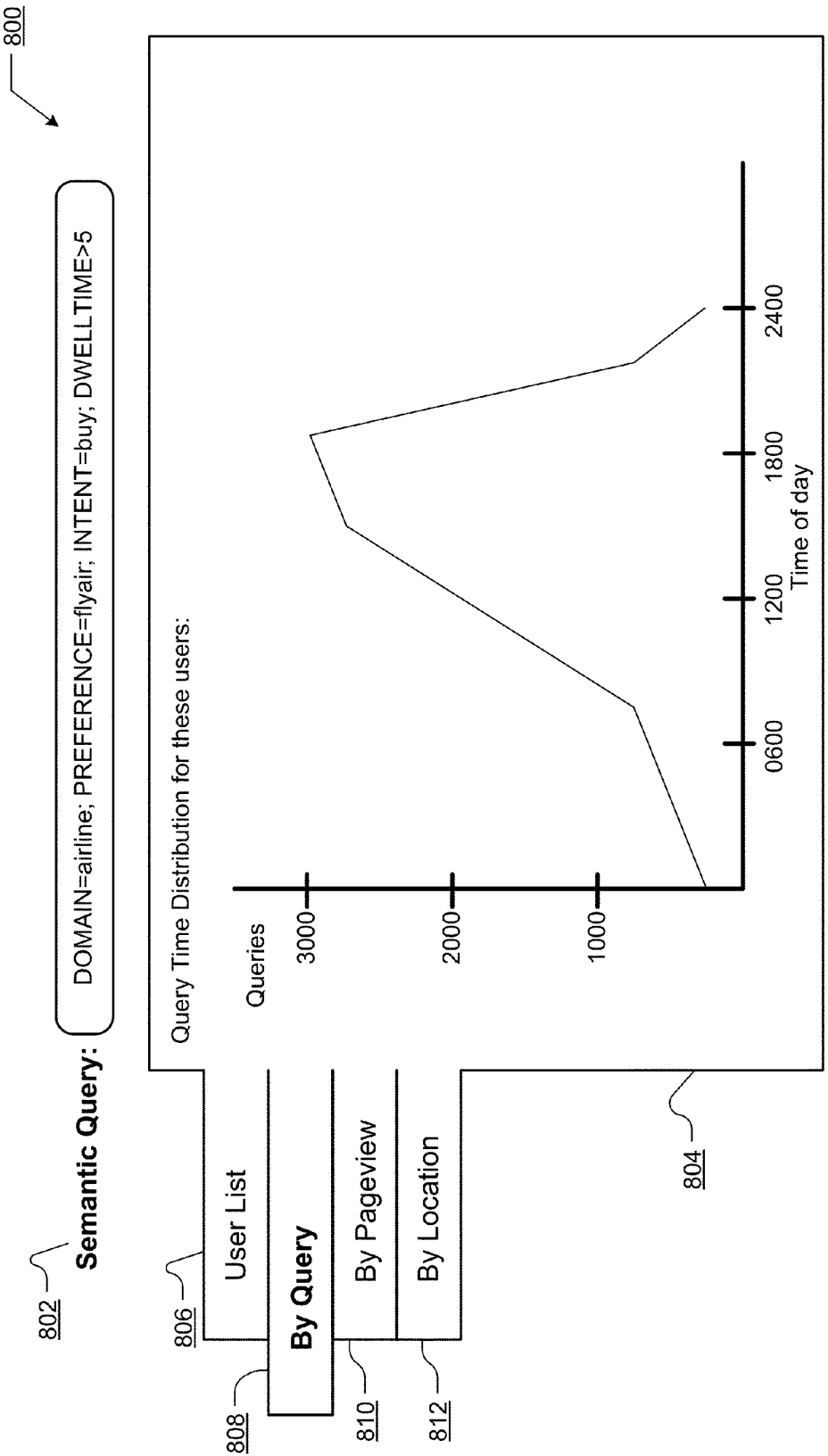

FIGS. 8A-8C depict various views of an example user interface 800 for displaying search results. User interface 800 includes an element 802 which displays the specified semantic query for which the search was performed. Various tabs 806, 808, 810, and 812 provide an advertiser with different views into the search results, displayed in display pane 804.

FIG. 8A depicts a scenario where the advertiser has specified a semantic query for users who expressed the intent to buy a phone. Here, the advertiser is viewing User List tab 806, which provides a ranked list of users whose semantic profiles fit the specified query. In some embodiments, detailed information regarding the user and the user's online behavior may be provided to the advertiser. As shown, the first ranked user (UserID=1234567) entered a particular search query six times (e.g. frequency=6) and viewed a particular web page three times. Additional information regarding the user's location, domain, preferences, intents and habits may also be displayed.

In some embodiments, user interface 800 may include further functionality to enable an advertiser to specify a user segment by selecting one or more of the displayed users. Such a user segment may then be targeted by the advertiser for one or more advertisements or advertising campaigns, e.g. the advertiser may select one or more particular advertisements to be displayed to users in the user segment.

FIG. 8B depicts a scenario in which the advertiser has specified a semantic query to search for users that have shown an interest in buying air travel services, with a preference for a particular airline brand "flyair." In this example, the advertiser has also specified DWELLTIME>5 as part of a semantic query, indicating a search for users who viewed web pages or search query results for longer than a certain specified time period (e.g. 5 seconds). In FIG. 8B, the advertiser has selected By Query tab 808 to specify a view into the result data based on search queries executed by the users. In this case, display pane 804 shows information for the queries executed by the users in the search result set, ranked by the total count. As shown in this example, 3215 users entered search queries related to "flyair" brand airlines, with the total number of such queries 4915. In this case, this particular set of users also entered search queries for other airlines "xyz airlines," "mocair," and so forth. Although not shown, an advertiser may also select tabs 810 or 812 to view results similarly summarized according to pageview or location. User interface 800 may also provide additional tabs to provide various others views into results.

In some embodiments, user interface 800 may also provide more detailed statistical analysis of the search results. Such an example is shown in FIG. 8C, in which the display pane 804 shows a graph of query frequency over time of day. In some embodiments user interface 800 may also include one or more controls to enable an advertiser to graphically select from the users based on the time of day at which they entered search queries for the specified domain, intent, etc. For example, using the chart displayed in pane 804, the advertiser may select from time of day 1200 to 1800 to select a subset of users who entered search queries for "flyair" airline during that time, to more narrowly target advertisements towards users who search online for airfares during the afternoon. Other types of statistical analyses may be included without departing from the scope or spirit of the claimed invention.

Example Use Cases

The following examples illustrate use cases that show uses and advantages of embodiments.

EXAMPLE 1

The Long Tail Advertiser

Mary owns an internet store which sells generic brand and/or inexpensive clothing. She wants to find potential customers, but she has a small budget for advertising and does not want to spend money on an expensive branding campaign. She prefers to accurately target a small group of users to deliver her advertisements. She uses embodiments described herein to specify a semantic query DOMAIN="clothing" AND INTENT="buy" AND PREFERENCE="inexpensive clothing" and receives a ranked list of users that fit those criteria. In accordance with her budget, she selects the top 5000 ranked users to target with her advertisements.

In this way, embodiments effectively enable advertisers to target narrowly defined segments. Such narrow segments may include the so-called long tail of users who continue to express interest in a product or service that was previously very popular, but is now less popular (e.g. has a long tail of popularity over time after a previous spike in popularity).

EXAMPLE 2

The Inexperienced Advertiser

Jack is the CEO of a startup internet company which provides social networking services to internet users. He would like to do some marketing through online advertising, to raise brand awareness and increase his user base. However, advertising is neither his expertise nor his main focus, and he has limited time to devote to the task. He is not familiar with the keywords he may specify to define a user segment, and therefore has a difficult time tuning a targeted user segment for a particular campaign. However, the semantic querying engine is more easily accessible to him, given the choices made available for search terms based on domain, intent, preference, and/or habit. Thus, Jack is able to define a semantic query for DOMAIN="internet service" AND PREFERENCE="social network" AND INTENT="participate" to find a ranked set of users whose online behavior indicates they may have an interest in participating in an online social network.

EXAMPLE 3

The Experienced Advertiser

Jin is an experienced advertising professional, and she knows how to use keywords to define a user segment. She has an existing user segment that she wishes to modify and fine-tune for a particular campaign. Using embodiments described herein, she can more easily determine new users to add into her existing user segment by defining one or more semantic queries and/or queries employing keywords to search directly into user behavior data. Thus, the embodiments described herein give her a powerful tool that she may use to target the right ads to the right potential customers.

Conclusion

Although the techniques have been described in language specific to structural features and/or methodological acts, it is to be understood that the appended claims are not necessarily limited to the specific features or acts described. Rather, the specific features and acts are disclosed as exemplary forms of implementing such techniques.

What is claimed is:

1. A computer-implemented method comprising:
receiving a semantic query that includes at least one of a user interest domain or a user intent;
responsive to the receiving the semantic query, retrieving a set of indexed semantic user profiles resulting from a search based on the semantic query, each indexed semantic user profile associated with a particular user of a plurality of users;
ranking the set of indexed semantic user profiles based at least in part on an index of each of the indexed semantic user profiles of the set; and
providing the ranked set of indexed semantic user profiles to enable selection of a target user segment.

2. The computer-implemented method of claim 1, wherein the ranking of the set of indexed semantic user profiles employs a ranking model developed using machine learning.

3. The computer-implemented method of claim 2, wherein the ranking model is developed using supervised machine learning.

4. The computer-implemented method of claim 2, wherein:
the ranking model is developed offline; and
the set of indexed semantic user profiles are ranked in an online mode in response to receiving the semantic query.

5. The computer-implemented method of claim 1, wherein the ranking of the set of indexed semantic user profiles is further based on a correspondence between the semantic query and each of the set of indexed semantic user profiles.

6. The computer-implemented method of claim 1, wherein each indexed semantic user profile is determined at least in part based on user behavior data.

7. The computer-implemented method of claim 6, wherein the user behavior data associated with the particular user includes at least one of search query data or page view data for the particular user.

8. The computer-implemented method of claim 6, wherein the indexed semantic user profile associated with the particular user includes at least one habit that is inferred based at least on temporal information in the user behavior data.

9. The computer-implemented method of claim 8, wherein the at least one habit is inferred based at least in part on a dwell time associated with at least one of viewing a web page or viewing results of a web query.

10. The computer-implemented method of claim 1, wherein the indexed semantic user profile associated with the particular user is determined at least in part based on a static user profile of the particular user.

11. The computer-implemented method of claim 10, wherein the static user profile includes at least one of demographic information or geographic information associated with the particular user.

12. The computer-implemented method of claim 11, wherein the static user profile is generated at least in part based on information from at least one of a social network, a gaming account, an e-mail account, a messaging service, a web portal account or an e-commerce site account.

13. The computer-implemented method of claim 10, wherein the static user profile is generated by an external process or service.

14. A system comprising:
one or more processors;
a modeling component, executable by the one or more processors, to generate a ranking model based at least in part on machine learning;
a query processing component, executable by the one or more processors, to:
receive a semantic query that includes at least one of a user interest domain and a user intent; and
retrieve a set of indexed semantic user profiles in response to the received semantic query, each indexed semantic user profile associated with a particular user of a plurality of users; and
a ranking component, executable by the one or more processors, to rank the set of indexed semantic user profiles based at least in part on the ranking model,
wherein the query processing component provides the ranked set of indexed semantic user profiles to enable selection of a target user segment.

15. The system of claim 14, wherein the machine learning incorporates a support vector machine technique.

16. The system of claim 14, wherein the semantic query is received from an entity seeking to define the target user segment.

17. The system of claim 16, wherein the ranked set of indexed semantic user profiles is provided to the entity as an ordered list of users that is ranked according to the ranking model.

18. One or more computer-readable storage media storing computer-executable instructions that, when executed by a computer, cause the computer to perform acts comprising:

receiving a semantic query that includes at least one of a user interest domain or a user intent;

responsive to the receiving the semantic query, retrieving a set of indexed semantic user profiles resulting from a search based on the semantic query, each indexed semantic user profile associated with a particular user of a plurality of users;

ranking the set of indexed semantic user profiles based at least in part on an index of each of the indexed semantic user profiles of the set; and providing the ranked set of indexed semantic user profiles to enable selection of a target user segment.

19. The one or more computer-readable storage media of claim 18, wherein the set of indexed semantic user profiles is ranked at least in part based on social network data.

20. The one or more computer-readable storage media of claim 19, wherein the social network data includes information on relationships between users, the information including at least one of:

information on degrees of separation between users; or information regarding strength of relationships between users.

* * * * *